United States Patent [19]

Strassel et al.

[11] Patent Number: 5,601,893
[45] Date of Patent: Feb. 11, 1997

[54] FLEXIBLE METAL PIPES WITH A SHRINKABLE POLYMER SHEATH, A PROCESS FOR THEIR FABRICATION, AND THEIR UTILIZATION AS FLEXIBLE TUBULAR CONDUITS

[75] Inventors: Albert Strassel, Oullins; Jean Hardy, Barentin, both of France

[73] Assignees: Elf Atochem S.A., Puteaux; Coflexip S.A., Paris, both of France

[21] Appl. No.: 340,997

[22] Filed: Nov. 17, 1994

Related U.S. Application Data

[63] Continuation-in-part of Ser. No. 120,621, Sep. 10, 1993, abandoned.

[30] Foreign Application Priority Data

Sep. 10, 1992 [FR] France ..................... 92.10810
Mar. 10, 1994 [FR] France ..................... 94.02765

[51] Int. Cl.⁶ ........................................ F16L 11/08
[52] U.S. Cl. ................. 428/35.9; 428/36.9; 138/120; 138/118; 138/122; 138/125; 138/127; 138/131; 138/137; 138/138; 138/139; 138/143; 138/136
[58] Field of Search ................. 428/35.9, 36.91; 138/120, 118, 122, 125, 127, 131, 137–139, 143, 58, 136

[56] References Cited

U.S. PATENT DOCUMENTS

| | | | |
|---|---|---|---|
| 2,044,900 | 6/1936 | Debenedetti | 138/58 |
| 2,256,386 | 9/1941 | Farrar et al. | 138/58 |
| 3,311,133 | 3/1967 | Kinander | 138/136 |
| 3,420,276 | 1/1969 | Skinner et al. | 138/127 |
| 3,712,841 | 1/1973 | Skinner et al. | 156/144 |
| 3,771,570 | 11/1973 | Coleman | 138/131 |
| 4,147,185 | 4/1979 | Hines | 138/121 |
| 4,727,909 | 3/1988 | Griffiths | 138/127 |
| 4,853,297 | 8/1989 | Takahashi et al. | 428/623 |
| 5,259,418 | 11/1993 | Hamrick | 138/104 |

FOREIGN PATENT DOCUMENTS

| | | |
|---|---|---|
| 166385 | 1/1986 | European Pat. Off. . |
| 2268614 | 1/1975 | France . |
| 2555920 | 6/1985 | France . |
| 2619193 | 2/1989 | France . |
| 2650652 | 2/1991 | France . |
| 373302 | 3/1931 | United Kingdom . |

OTHER PUBLICATIONS

Compagnia Italiana Tubi Metallici Fleesibili, abstract of BE 377,796 Mar. 1931 No Translation.

*Primary Examiner*—Charles Nold
*Attorney, Agent, or Firm*—Pennie & Edmonds

[57] ABSTRACT

This invention relates to a flexible metal pipe covered with an impermeable sheath of a shrinkable, preferably semicrystalline polymer or polymers, characterized in that it incorporates between the shrinkable polymer sheath and the metal pipe an intermediate elastomer layer (8), optionally vulcanized or reticulated, and/or a TPE in the form of a continuous tubular sleeve (FIG. 3) or of a tape (FIG. 4 to 6). Sheathed pipes of this type are particularly suitable for flexible pipelines, optionally with suitable supports, for carrying oil and gas.

29 Claims, 3 Drawing Sheets

FLEXIBLE METAL PIPES WITH A SHRINKABLE POLYMER SHEATH, A PROCESS FOR THEIR FABRICATION, AND THEIR UTILIZATION AS FLEXIBLE TUBULAR CONDUITS

CROSS-REFERENCE TO RELATED APPLICATION

This application is a continuation-in-part of application Ser. No. 08/120,621, which was filed on Sep. 10, 1993, now abandoned.

FIELD OF THE INVENTION

This invention relates to flexible metal pipes provided with a shrinkable polymer sheath, and in particular to flexible tubular conduits incorporating such a sheathed flexible metal pipe and offering significant mechanical resistance especially to internal pressure, permitting their use for instance in off-shore oil and gas production.

BACKGROUND OF THE INVENTION

The flexible metal pipes may be produced in conventional fashion by the coiling of a profiled interlocking strip (for example as per FR 2 555 920) or of a wire with interconnected helical turns (for example as per FR 2 650 652) or by any other process that gives the pipe good flexibility.

Flexible tubular conduits generally incorporate a flexible metal pipe serving as the inner frame which is formed by a helically coiled, profiled metal strip, for instance with interlocking turns, which interlocking strip-coil frame is covered with an impervious polymer sheath and the entire assembly is covered with reinforcing layers to withstand pressure as well as the underwater environment. Such flexible conduits are described for instance in patents FR 2.619.193 and in "Recommended Practice for Flexible Pipe - API Recommended Practice 17 B (RP 17 B) First Edition Jun. 1, 1988".

Bending of the flexible metal pipes is made possible by providing spaces between the helical turns. The interconnection between the turns is never impervious to liquids or to gas. Therefore, an impermeable polymer sheath is fitted over the metal pipe. One may use for instance vulcanized rubber or, for conduits having greater mechanical strength, a thermoplastic polymer offering the required mechanical properties, for example polyethylene, for moving water or degassed crude oil in the extraction of underwater deposits.

What is most wanted, however, is to find a polymer material which offers three qualities: Low permeability to liquids and/or gas, resistance to a wide range of operating temperatures (both mechanical resistance and chemical insensitivity to high temperatures), and easy industrial implementation. Certain semicrystalline polymers possess all of these qualities, with the more crystalline types among them being of particular interest due to their low permeability. On the other hand, the higher the rate of crystallinity of a polymer, the higher its rate of physical stress as it passes from the molten state to its crystallized solid state. If this shrinkage is prevented as in the case of a sheath extruded around a metal pipe, residual stress is produced especially in the form of tension within the polymer, weakening the sheath's shock resistance and flexibility.

Moreover, when the polymer sheath is extruded onto the metal pipe, the polymer enters into the spaces between the helices, thus reducing the degree of flexible movement of the pipe. Depending on the required properties and the intended use of the flexible pipe, such interstitial penetration of the polymer is acceptable in many cases. For certain applications this penetration effect is even sought intentionally (FR 2 268 614). However, given that high-resistance flexible conduits are envisioned for heavy-duty operating conditions, it has been found that the penetration of the polymer in the spaces between the helices can have a negative effect on the performance of the sheath. In particular, studies have revealed initial fissures which can lead to progressive ruptures and to leaks both locally and at the perimeter of the raised section of the sheath as a function of the degree of polymer penetration between the helical turns.

For flexible pipes used in oil or gas extraction where the sheath material must also stand up to live crude without blistering or inflating, the metal pipes can be sheathed with polyamide-11 (PA-11) or, for more demanding operating conditions, with a fluorinated polymer, in particular polyvinylidene fluoride (PVDF). Polyvinylidene fluoride, by virtue of its crystallinity, chemical near-insensitivity and imperviousness to liquids and gas as well as its resistance to a temperature on the order of 105° C. over many years, is the material of choice for the sheathing of flexible metal pipes, yet its rigidity does not permit such use.

To overcome this drawback, the PVDF may be plasticized. However, experience shows that the plasticizers migrate out of the polymer, causing the latter to return to its original rigidity over a period of time depending again on the temperature of the liquids flowing through the pipe. One can also use plasticized PA-11 to produce a leak-proof polymer sheath for flexible metal pipes. As an alternative to the modification of an excessively rigid polymer by the application or admixture of a plasticizer, another known approach has been to copolymerize a predominant part of the monomer corresponding to at least one other comonomer.

Nevertheless, the polymer sheaths that can be produced by known methodology have limitations in their possible uses, the limitations being dependent upon performance requirements, especially when the pipe is to carry live crude oil under high pressure and/or at high temperatures. On the one hand, plasticized polymers are affected by the migration of the plasticizers and, in spite of the plasticizing, they also involve the risk of a weakening in the areas between the helices when subjected to severe operating conditions. On the other hand, certain extra high-performance polymers whose use would be of interest with no or relatively little plasticizing remain practically ineligible due to their excessive rigidity.

SUMMARY OF THE INVENTION

It has now been found that it suffices to interposition an elastomer between the metal pipe and the shrinkable polymer.

This invention thus covers a flexible tubular conduit incorporating an inner flexible metal pipe whose outer surface displays interstitial spacings and which is covered by a shrinkable polymer sealing sheath, characterized in that it incorporates between the shrinkable polymer sheath and the metal pipe an intermediate elastomer layer in a manner that the sealing sheath rests on the elastomer layer in the areas where the said sheath covers an interstitial space and that its penetration of the space is negligible or zero.

The prior art has not solved this problem satisfactorily. EP 166 385 describes the wrapping of a polyester tape around the flexible metal pipe to prevent the PVDF from penetrating the spaces. That technique has been tested and it has been found that the tape partially overlaps itself which is practically unavoidable in an industrial production operation and which proved to be enough to indent the PVDF and bring about a rupture when bent.

U.S. Pat. No. 3,771,570 describes flexible metal pipes made up of interlocking helices and covered with a polymer sheath (preferably of polyvinyl chloride (PVC)). The problem posed was the shifting of the sheath relative to the metal pipe. An adhesive layer is therefore incorporated between the metal helices and the PVC to make the PVC sheath adhere to the metal helices. The PVC completely penetrates the spaces between the helical turns.

GB 373 302 describes flexible conduits without reinforcing armor which resist internal pressure, incorporating a flexible metal pipe constituted of interlocking helices covered with a rubber sealing sheath, and a thin, relatively strong layer consisting for instance of a sheet of cellophane sandwiched between the interlocking helices and the rubber for the purpose of protecting the latter from the petroleum carried by the flexible pipe. Between the metal helices and the cellophane sheet one can also insert a filler material. The cellophane is in the form of a tape wrapped around the helices or applied as a coating in the form of a solution. The rubber is then applied to the outside and vulcanized. The vulcanization serves to facilitate the adhesion and the penetration of the cellophane sheet which forms a troughlike fold in each space between two helical turns, with each such space corresponding to a very marked bulge on the inner surface of the rubber. That is exactly the opposite of what is intended by this present invention.

According to the present invention, an elastomer is applied around the flexible metal pipe in an amount large enough to prevent the shrinkable polymer from penetrating the spaces between the helices very much if at all, with the elastomer thus forming around the flexible metal pipe an intermediate layer which may envelop the pipe either in one piece or in sections. The elastomer penetrates each individual space between the helices either partly or entirely. Empirical investigation has shown that, due in particular to the right choice of elastomer material, the shrinkage of the polymer sheath which took place upon cooling after extrusion causes a portion of the elastomer to penetrate the interstitial spaces and to substantially reduce or even eliminate essentially any residual stress on the polymer of the sealing sheath.

Also, the amount of elastomer already in place in the interstitial spaces at the time of the polymer extrusion can be selected, as a function of the respective viscosity values of the elastomer and the polymer of the extruded sheath, in a way as to prevent the formation of significant bulges that are encountered in the fabrication of flexible conduits along earlier techniques. It is also possible to limit the penetration of the polymer sheath in the area where it covers an interstitial space in such a way that the inner surface exhibits only a slight, not very high nor significantly curved enlargement. In particular, this inner surface can be essentially cylindrical with a nearly constant cross section over the length of the flexible conduit.

DESCRIPTION OF THE PREFERRED EMBODIMENTS

Figure 1:
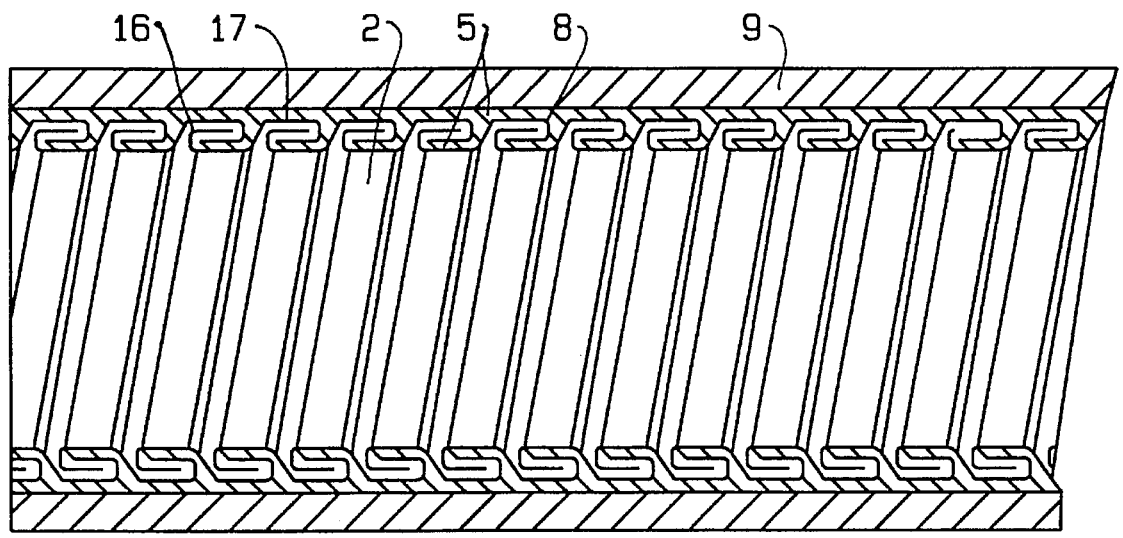
FIG. 1 shows the cross-section along a longitudinal axis of a flexible tubular conduit according to the first mode of implementation of this invention.

As indicated above, the present invention provides an elastomer which is applied around a flexible metal pipe in an amount large enough to prevent the shrinkable polymer from penetrating the spaces between the helices very much if at all, with the elastomer thus forming around the flexible metal pipe an intermediate layer which may envelop the pipe either in one piece or in sections.

The elastomer penetrates each individual space between the helices either partly or entirely. Empirical investigation has shown that, due in particular to the right choice of elastomer material, the shrinkage of the polymer sheath which took place upon cooling after extrusion causes a portion of the elastomer to penetrate the interstitial spaces and to substantially reduce or even eliminate essentially any residual stress on the polymer of the sealing sheath.

Also, as indicated above, the amount of elastomer already in place in the interstitial spaces at the time of the polymer extrusion can be selected, as a function of the respective viscosity values of the elastomer and the polymer of the extruded sheath, in a way as to prevent the formation of significant bulges that are encountered in the fabrication of flexible conduits along earlier techniques. It is also possible to limit the penetration of the polymer sheath in the area where it covers an interstitial space in such a way that the inner surface exhibits only a slight, not very high nor significantly curved enlargement. In particular, this inner surface can be essentially cylindrical with a nearly constant cross section over the length of the flexible conduit.

In a first implementation of this invention, the elastomer layer constitutes a tubular sleeve covering the flexible metal pipe in one piece. In the areas where it covers the cylindrical median section of the helices making up the flexible metal pipe it has a nearly constant thickness which is preferably between 0.1 and 2 min. The polymer sealing sheath does not touch the flexible metal pipe at any point.

In a second implementation, instead of covering the entire flexible metal pipe, the intermediate elastomer layer is placed only in the interstitial spaces between the helical turns. In this design the elastomer layer is in the form of a more or less thick, continuous tape having an approximately constant cross section and being applied in a generally helical fashion around the axis of the flexible conduit corresponding to the free space between neighboring helical turns of the constituent sections, such as interlocking helical strips, of the flexible metal pipe.

Alternatively, the elastomer layer may be comprised of two, three, or even more helicoidal elements, for instance tapes, when the flexible metal pipe consists of two, three or more sections.

In the above implementations the elastomer fills the outer part of each interstitial space to a more or less significant depth, with the elastomer coverage of the free area within the spaces optionally being essentially complete. Preferably, the amount of elastomer should be between 25% and 75% of the free spatial volume within the spaces between the helices.

The shrinkable polymer

The shrinkable polymer is defined as any one polymer or mixture of polymers whose mold shrinkage is greater than or equal to 0.3%, 1% or, better yet, 3%. The shrinkable polymer is preferably of the semicrystalline polymer type.

The semicrystalline polymers which are suitable for the purposes of this invention are those described in the POLYMER HANDBOOK, Third Edition (published by BRANDRUP and E. H. IMMERGUT) VI/1 to 89, and in particular the following:

—the polyolefins,
—the polyamides.
—the polyurethanes and polyureas,
—the polyesters,
—the polyethers,
—the polyoxides,
—the polysulfides (PPS),
—the polyether-ether-ketones (PEEK) and their copolymers,
—the fluorous polymers such as:
  —the homo- and copolymers of vinylidene fluoride ($VF_2$),
  —the homo- and copolymers of trifluoroethylene ($VF_3$)
  —the copolymers, and especially terpolymers, associating remainders of the activators chlorotrifluoroethylene (CTFE), tetrafluoroethylene (TFE), hexafluoropropene (HFP) and/or ethylene and optionally the activators $VF_2$ and/or $VF_3$.

Among the fluorous polymers, the more suitable ones are the vinylidene fluoride-based homo- and copolymers due to their excellent chemical insensitivity to live crude oil or gas and their stability at high temperatures. By way of example, especially for oil and natural gas, it has been noted that a copolymer having at least 50% by weight vinylidene fluoride activators in the polymeric chain could provide sufficient impermeability. The definition of fluorous polymers also refers to mixtures of at least 70% by weight of the above with other polymers.

Without departing from the substance of this invention, the shrinkable and preferably semicrystalline polymers may also contain plasticizers, fillers, pigments, stabilizers, anti-impact reinforcements, and other such conventional additives.

The elastomeric polymers The elastomeric polymers which make suitable materials for producing the intermediate elastomer layer (8) are defined by ASTM D 883 as materials which, at ambient temperature, quickly return to their approximate initial dimensions and shapes after having undergone a significant deformation as a result of minor stress applied to the slack material.

Suitable elastomeric polymers not only include elastomers proper (applied in their vulcanized or reticulated state) but also thermoplastic elastomers (widely referred to as TPE) which exhibit an elongation at their flowage threshold of greater than 15%. The TPEs rank between thermoplastic resins which are easy to work with and versatile but have limited temperature-resistance qualities or dynamic properties, and the elastomers having highly elastic properties but are difficult to work with, complex and often environmentally polluting. The structure of TPEs always displays two incompatible phases one of which brings together the dispersed thermoplastic sequences in the elastomer phase. In general one distinguishes between 5 TPE categories:

—The thermoplastic polyolefin elastomers (TPO) are physical mixtures made from polyolefins. There are those which contain more than 60% polypropylene and those with a preponderant elastomer phase (over 70%) and which may or may not be reticulated.

—The polystyrene-based copolymer units whose rigid phase consists of polystyrene sequences while their pliant phase may be formed for instance by polybutadiene (SBS), polyisoprene (SIS), or poly(ethylene/butylene) (SEBS) sequences.

—The polyurethane-based copolymer units (TPU) which can be obtained by the joint reaction of a diol of high molecular mass constituting the crystallizable pliant sequence of the TPE, with a diisocyanate and a diol of low molecular mass which engenders the rigid sequence.

—The polyester-based copolymer units such as those obtained by the copolymerization of a polybutylene terephthalate (PBT) or a polyethylene terephthalate (PET) which constitutes the rigid and crystalline sequences, and a glycol of low molecular weight (butane diol, diethylene glycol) which, in association with a polyalkylene ether glycol, forms the crystallizable pliant sequence.

—The polyamide-based copolymer units whose rigid sequences are constituted of polyamide (PA) and the pliable crystallizable sequences of polyether, also known as polyetheramides.

Preferably, the stiffness of the elastomer is less than that of the shrinkable polymer: It can be evaluated in terms of torsion and/or flexion and/or tension moduli and/or Shore hardness values which values are measured under the same conditions for both the elastomer and the shrinkable polymer. Preferably, the stiffness of the elastomer should remain below that of the shrinkable polymer regardless of the operating conditions when in use, especially in terms of temperature and in due consideration of the ageing of these materials.

It is preferred that the elastomer be of a Shore A hardness at 23° C. of less than 92 (and ideally less than 70), or of a Shore D hardness of less than 50 when measured by the ISO 868 standard.

Preferably, the torsion modulus of the elastomer at 23° C. is less than 100 N/mm$^2$ or, better yet, less than 30 N/mm$^2$ and ideally less than 10 N/mm$^2$ (measured according to DIN standard 53447).

It is preferred that the tension modulus of the elastomer at 23° C. be less than 400 MPa or, better yet, less than 100 MPa (measured according to ISO 527).

Preferably, the tensile strength i.e. break elongation of the elastomer at 23° C. is greater than 50%.

In the case of TPEs, the preferred material is one which has a VICAT of less than 70° C. when measured by the A/50 method according to the ISO 306 standard.

It is best to use elastomers which simultaneously display the above-specified values in terms of hardness, VICAT level, torsion modulus and breaking elongation.

Preferably, the torsion modulus of the elastomer remains below 30 N/mm$^2$ (measured according to DIN standard 53447) over the course of its thermal ageing.

The elastomers and/or TPEs specially recommended within the framework of this invention may be selected from among copolymers of ethylene/propylene/diene monomer (EPDM), acrylonitrile/butadiene/styrene copolymers, methylmethacrylate/butadiene/styrene copolymers, ethylene/carbon monoxide copolymers, ethylene/carbon monoxide/vinyl acetate copolymers, acrylic rubbers, thermoplastic copolyethers/esters, polystyrene and polyisoprene, polybutadiene, and the like copolymer sequences, styrene/butadiene/styrene copolymers, ethylene/ethylacrylate, ethylene/ethylacetate and ethylene/vinyl acetate copolymers as well as their terpolymers, fluorous elastomers, silicone elastomers, fluorous silicone elastomers, and polyurethanes.

Within the framework of this invention one can also use elastomer and/or TPE mixtures.

For the requirements of this invention one can use a thermoplastic polyurethane (TPU) elastomer of a Shore A hardness less than 92 as measured in accordance with ISO standard 868. Moreover, it is preferred that this elastomer can sustain a strong viscosity reduction during thermal ageing. This viscosity reduction is preferably at least 60% after 30 days at 120° C. The thermoplastic polyurethane elastomer usually displays a viscosity at 20° C. that lies within the image shown below. The values take into account the RABINOWITCH correction as applied to non-Newtonian liquids.

| Corrected shear rate s$^{-1}$ | Viscosity in kPa.2 |
|---|---|
| 4.09 | 0.7–1.3 |
| 13.64 | 0.25–0.85 |
| 36.15 | 0.19–0.78 |
| 122.91 | 0.12–0.70 |

The shear rate shown is also the shear-deformation rate gradient.

In general, the elastomer should preferably have a high level of chemical insensitivity and temperature stability, especially in the case of conduits carrying live crude which contains various components that are highly damaging to a great many plastic materials. Especially in the case of live crude which generally includes a more or less significant water content, the elastomer chosen should preferably be one that is not susceptible to the effect of hydrolysis on the relatively high temperature of the crude coming out of the well, nor to any other form of water-induced degradation. Also, as a function on the one hand of the shrinkable polymer selected for the sealing sheath and, on the other hand, of the operating environment of the conduit and in particular the temperature and the liquids carried, the elastomer is preferably chosen in a way that any possible degradation products do not pose the risk of affecting the performance characteristics of the shrinkable polymer as they progressively migrate through the sealing sheath.

An interesting example of elastomers possessing the desired properties of stability and chemical insensitivity is found in the silicone group, and in particular the elastomer silicones of the RTV type (vulcanizable at ambient temperature) or HCR type (cold-vulcanizable). In the case of HCR as well as RTV silicones, the vulcanization can be performed in continuous fashion so as to speed up the operation, with the flexible conduit being drawn through or past heating devices (such as a hot-air or radiant or other type of heating system).

The elastomer is selected and applied in a way that its interposition prevents the penetration of the polymer of the sheath into the recesses between the helical turns; thus, the flow of the hot material during the extrusion of the polymer sealing sheath and the effect of the stress applied by the sheath during its shrinkage will cause it to penetrate the open spaces of the outer surface of the flexible metal pipe corresponding to the interstitial spaces between the helical turns in a way that the polymer of the sheath is free to retighten itself around the metal pipe without generating within itself any internal stress.

The drawings

Figure 2:
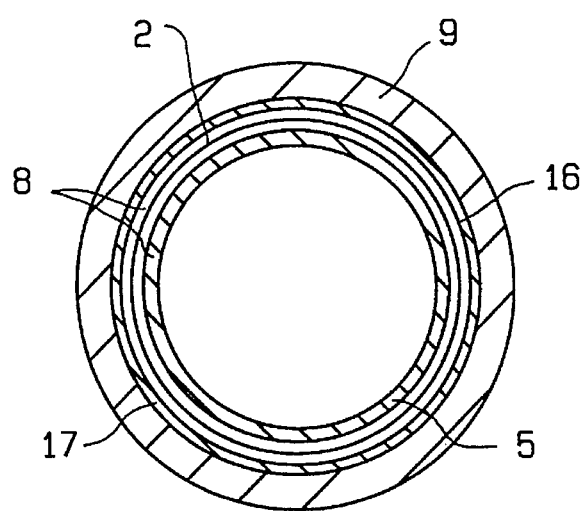
FIG. 2 shows the cross-section along a transverse axis of a flexible tubular conduit according to the first mode of implementation of this invention.

FIGS. 1 and 2 of the attached diagrams show the cross sections along both axes of a flexible tubular conduit according to the first mode of implementation of this invention. The interlocking articulation lips (16,17) of the flexible metal pipe (2) create interstices and spaces (5) between the helical metal turns. The elastomer layer (8) covers the metal pipe, filling all the spaces between the metal helices. This elastomer layer serves as an intermediate layer between the flexible metal pipe and the outer, shrinkable polymer layer (9).

Figure 3:
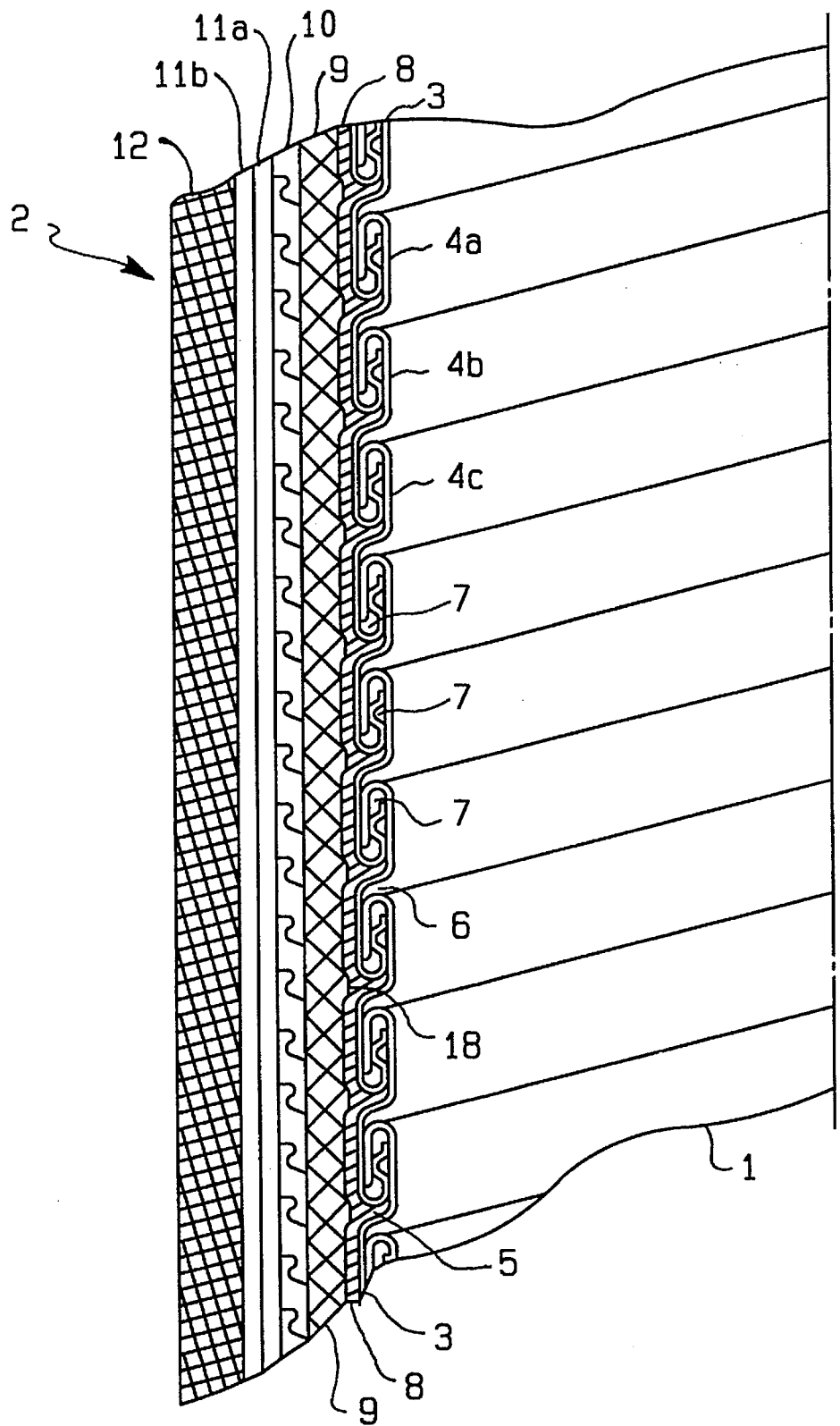
FIG. 3 shows a longitudinal cross-section of a flexible tubular conduit intended for carrying water, oil, or gas in an offshore extraction operation according to the first mode of implementation of this invention.

FIG. 3 of the attached diagrams shows the cross section of a flexible tubular conduit again according to the first mode of implementation of this invention but more specifically intended for carrying water, oil or gas in an offshore extraction operation. The flexible metal pipe (1) constituting the inner frame of the flexible pipe (2) is produced by closely coiling an interlocking strip (3) whose successive turns (4a, 4b, 4c, ...) delimit an interstitial space (5) that opens toward the outside in a generally helical configuration, as well as internal interstices (6) that open toward the inside of the pipe, and inner spaces (7) which are more or less closed. The elastomer layer (8) covers the flexible metal pipe in continuous fashion, filling all the interstitial spaces (5) between the helical turns. This elastomer layer serves as the intermediate layer between the flexible metal pipe and the shrinkable polymer layer (9) which constitutes the inner sealing sheath of the flexible conduit. The reinforcing armor cladding on the outside of the sealing sheath assures mechanical strength of the flexible conduit and in particular its resistance to internal pressure within the pipe when in use, the effect of the internal pressure being fully transmitted to the said armor through the sealing sheath. The plastic material of the sealing sheath is thus subjected to very specific working conditions, with a virtually uniform pressure stress field whose extremely high value, optionally reaching or exceeding 100 MPa, corresponds to the internal pressure, while deformations and shear stress remain quite low.

In the case of the example illustrated, the circumferential pressure or hoop stress resistance is substantially assured by the said pressure-absorbing armor cladding (10) consisting of a closely coiled wire or strip, preferably of the interlocking wire type such as Zeta wire, while the axial components of the force are retained by the pair of armor sleeves (11a, 11b) consisting of a plurality of wires at opposing angles of, for instance, 30° or 40°, in relation to each other. Alternatively, resistance to the internal pressure can be provided by a single pair of armor sleeves whose wires are wound in opposite direction to each other at an angle of about 55°. The wires of the armor sleeves (10, 11) typically consist of metal such as steel or aluminum, or of a preferably fiber-reinforced plastic, or even of a high-strength fiber material.

The flexible tubular conduit is protected by an outer sheath (12) preferably made by extrusion from a thermoplastic polymer.

The role of the flexible metal pipe (1) is to assure crush resistance of the flexible conduit and to prevent a collapsing of sealing sheath under certain operating conditions.

Compared to bonded flexible pipes, the flexible conduit (2) is of the unbonded flexible type that incorporates separate structural elements which is a particularly interesting aspect of this invention.

In the case of the example per FIG. 3, the elastomer layer (8) constitutes a continuous tubular sleeve which envelops the flexible metal pipe (1), and its outer surface, which is in contact with the inner surface of the sealing sheath (9), is approximately cylindrical, with a minor depression (18) at the location of the interstitial spaces (5). The elastomer of the layer (8) fills the interstitial spaces (5) in essentially complete fashion. Alternatively, depending especially on the viscosity and the amount of the elastomer as well as the fabrication process, it would be possible according to a mode of implementation not illustrated, to produce the intermediate layer (8) with less penetration in the interstitial spaces (5) corresponding to side a illustrated in FIGS. 3A and 3B.

Figure 4:
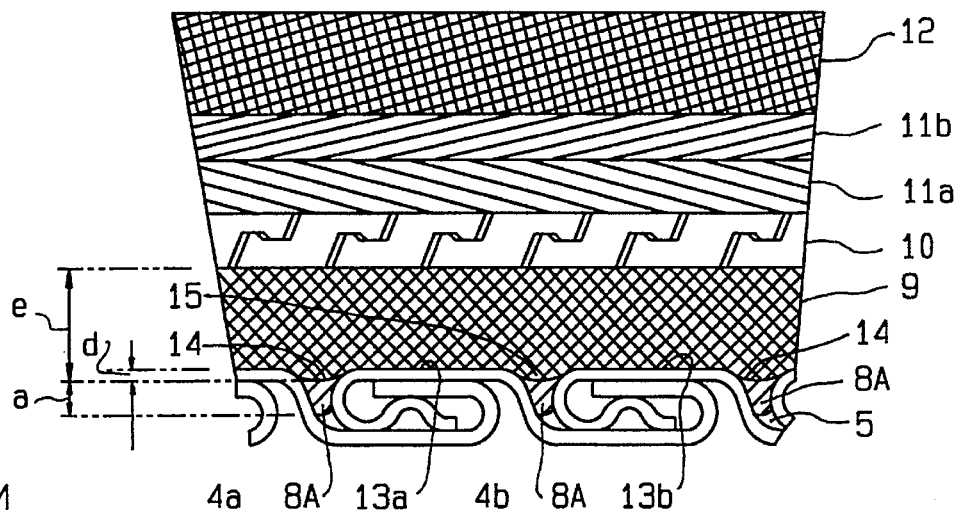
FIG. 4 shows an enlarged, partial longitudinal cross-section through a flexible conduit according to a second mode of implementation of this invention.
Figure 5:
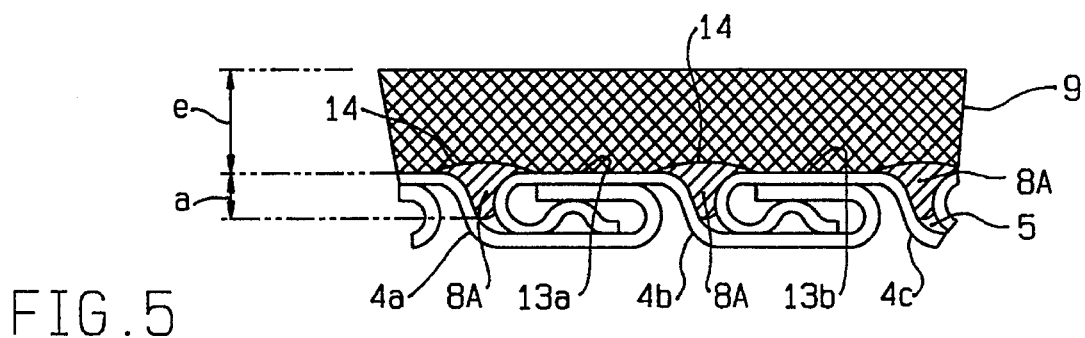
FIG. 5 shows an enlarged, partial longitudinal cross-section through a flexible conduit according to a second mode of implementation of this invention, detailing partial penetration by elastomer into the interstitial spaces.
Figure 6:
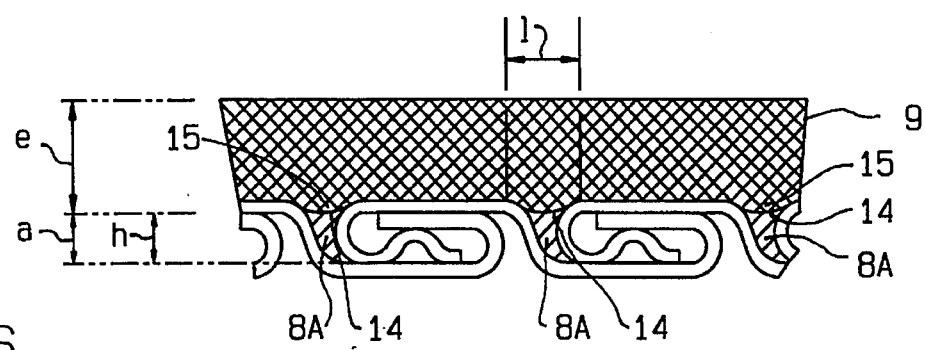
FIG. 6 shows an enlarged, partial longitudinal cross-section through a flexible conduit according to a second mode of implementation of this invention, detailing essentially complete penetration of the interstitial spaces by elastomer.

FIGS. 4 to 6 show an enlarged, partial longitudinal section through a flexible conduit according to a second mode of implementation, incorporating an intermediate elastomer layer (8) consisting of an elastomer tape (8A) placed in the interstitial space (5) which separates the cylindrical outer parts (13a, 13b, 13c, . . . ) of the successive helical turns constituting the flexible metal pipe (1). The alternating succession of cylindrical outer parts (13) of the metal pipe and the outer surfaces (14) of the elastomer tape (8A) produces an approximately cylindrical surface which supports the sealing polymer sheath (9) in continuous fashion.

When the flexible metal pipe is made up of a continuous helical coil of a single strip such as an interlocking hoop-type strip (3), the elastomer layer (2) is comprised of a single continuous tape (8A). Alternatively, the flexible metal pipe can incorporate one or several contoured sections coiled in parallel, with the elastomer layer (2) consisting of a number of tapes (8A, 8B, . . . ) equal to the number of contoured sections (3A, 3B, . . . ) of the flexible metal pipe.

FIG. 4 which illustrates a variation of the second mode of implementation also shows the armor cladding of the flexible pipe, incorporating in this case a pressure shield (10) and two tension-absorbing sleeves (11a, 11b) as well as the outer sheath (12).

In the case of the variations according to FIGS. 4 and 5 the elastomer partially penetrates into the interstitial spaces (5), with the inner end of the area occupied by the elastomer located at a radial distance of a relative to the cylindrical surface defined by the outer cylindrical parts (13) of the flexible metal pipe. The version according to FIG. 6 incorporates an intermediate layer consisting of an elastomer tape penetrating the interstitial spaces (5) in approximately complete fashion.

As compared to the ideal configuration which would be a perfectly cylindrical surface along the extension of the cylindrical sections (13) of the interlocked strip, the outer surface (14) of the elastomer may display an irregular form such as a minor depression or bulge.

The irregularity in the outer surface (14) would preferably be in the form of a hollow like a meniscus whose concave side faces toward the outside as illustrated in FIGS. 4 and 6. In this case, the polymer sealing sheath (9) exhibits on its inner side a slight bulge (15) whose thickness d in the radial direction relative to the cylindrical reference surface defined by the cylindrical surfaces (13) of the interlocked strip is preferably less than or equal to 0.3 e, e being the thickness of the sheath (9) in its cylindrical section around the surfaces (13).

Alternatively, the elastomer tape (8A) can be of a shape that is slightly convex toward the outside (FIG. 5). Its outer surface (14) has a cylindrical central part which connects to the outer surface of the interlocking strip (3) in a gradual progression with a very slight curvature and which is marginally separated from the said cylindrical reference surface, with the radial distance separating the two surfaces preferably being less than 0.2 e.

In general, regardless of the mode of implementation chosen and in particular in the case of the examples shown in FIGS. 1 to 6, good results are achieved if the curvature of the inner surface of the polymer sealing sheath (9) remains limited to very low levels in the areas adjoining interstitial spaces (5) where it can have minor irregularities. Preferably, the smallest radius of curvature that this inner surface should display is greater than 0.5 e and, better yet, greater than the e-value of the thickness of the sheath (9), with these radii of curvature at least equal to 2 e permitting maximum utilization of the intrinsic properties of the material.

The thickness of the shrinkable polymer sheath (9) may generally vary between 1 and 30 mm and the average would be between 3 and 15 mm depending primarily on the diameter of the flexible tubular conduit.

The width l of the interstitial space (5) at the plane of its outer opening, i.e. its width between the cylindrical parts (13) of neighboring helical turns, may vary between 2 and 40 mm. The edges of the interlocked contoured section, such as the interlocked strip (3), which form the boundaries of the space (5) are preferably rounded so that the width of the interstitial space diminishes from the outside toward the inside. If measured at a plane corresponding to the mid-point of the radial depth h of the interstitial space, the width of the space may be on the order of 1 to 15 mm. In practice, the depth h of the space may vary between 1.5 and 30 mm, meaning that the h/l ratio between the depth h and the outer width l may thus vary between 0.4 and 1.4.

The fabrication of substantial continuous lengths of the flexible conduit according to this invention can be accomplished producing the polymer sheath (9) by conventional extrusion methods. Where the elastomer layer (8) constitutes a continuous tubular envelope around the flexible metal pipe, the elastomer can be applied by extrusion onto the flexible metal pipe. In this case it is possible for instance to simultaneously coextrude the shrinkable polymer and the elastomer by means of two extruders and a double-headed flow-distribution box in which the flexible pipe to be sheathed is centered. The penetration of the elastomer into the interstitial spaces (5) between the helices of the flexible metal pipe now depends, especially in a first pass, on the viscosity of the thermoplastic elastomer in its molten state. It is also possible to sheathe the flexible metal pipe conventionally by extruding the elastomer sheath onto the metal pipe and then cover the assembly with a shrinkable polymer layer in a second, in-line extruding operation further downstream at the output end of the first extruder from which the elastomer-coated flexible pipe emerges (extrusion tandem), or in a separate extruding operation performed after the first extrusion, or even by sheathing the flexible metal pipe with the elastomer, optionally dissolved in a solvent and then, after perhaps a reticulation and/or evaporation of the solvent, in a second pass, covering the assembly with a layer of shrinkable polymer by extrusion sheathing.

Alternatively, the intermediate elastomer layer can be produced either in the form of a continuous tubular sleeve as illustrated in FIG. 3, or in the form of a tape (SA) placed in the interstitial spaces (5), as shown in FIGS. 4 to 6, by an induction process, or by spraying for instance with an aerosol or especially electrostatic precipitation, or by immersion in a liquid bath involving for instance the dissolving of the elastomer in a solvent, or in a fluidized bed, or by any other known process for covering the surface and/or the interstitial surface gaps of the flexible metal pipe with the elastomer. In the case of vulcanizable elastomers, the elastomer can also be successively applied to the metal pipe in its raw state and then vulcanized, preferably prior to the extrusion of the sealing sheath (9). One advantageous process involves the application of the elastomer by passing the flexible metal pipe in continuous fashion through a chamber filled with raw elastomer, for which the metal pipe (1) enters and exits the chamber through circular openings which may be provided for instance with a rubber collar whose diameter is calibrated in a way that it embraces the pipe (1) or, leaving a certain amount of free space, that the intermediate elastomer layer can be produced in the form of a tape (8A) applied in the interstitial spaces or in the form of a continuous tubular sleeve.

According to another application process, the elastomer can be put in place by helically wrapping it around in the form either of ties or of a continuous tape, the elastomer being in the vulcanized or thermoplastic state. One can also use tie rings if the material is sufficiently soft to permit adaptation to the desired shape of the elastomer tape (8A). One would preferably use a ring or tie in the form of an elastomer whose cross section is so made as to correspond to the configuration of the interlocking contoured sections (3) which radially flank and delimit the interstitial space (5) on each side. Ties so shaped, having a cross section corresponding to the profile of the interstitial spaces, can thus constitute for instance the tape (8A) illustrated in FIG. 3.

Without departing from the framework of this invention, one can produce an intermediate elastomer layer (8) in the form of a continuous tubular sleeve by helically coiling an elastomer ribbon with the edges butting, with the elastomer being sufficiently soft to permit easy shaping especially under the effect of the extrusion of the sealing sheath (9), so as to produce a regular, fairly smooth outer surface without overlapping and without gaps between adjoining turns. On its inner surface the band may incorporate a raised midsection that protrudes in adaptation to the profile of the interstitial spaces (5) so as to securely fill the spaces to a certain depth corresponding to the side wall a per FIGS. 4 and 5.

A variation of this invention, not illustrated, consists in the interpositioning of a thin sheet produced by wrapping one or several layers of a tape, made for instance of a fabric, of fibers or of a plastic material optionally fiber-reinforced, between the flexible metal pipe (1) and the intermediate elastomer layer (8). For easier industrial production, the wrapping of the tape may take place by the overlaying of a sheet of regular characteristics; the elastomer material supporting the tape is not in contact with the surface of the flexible pipe and is therefore not affected and/or degraded by the surface irregularities created by such overlaying. One uses preferably a tape of sufficient mechanical strength so that the sheet permits easy partial and regular filling of the interstitial spaces (5) with the elastomer of the intermediate layer.

Within the framework of this invention, and for the purpose of strengthening the adhesion between the elastomer and the shrinkable polymer, a certain amount of shrinkable polymer can be added to the intermediate elastomer layer and/or a certain amount of elastomer can be added to the shrinkable polymer prior to their extrusion for instance by one or the other of the methods described above. One can also interpose between the intermediate elastomer layer and the shrinkable polymer sheath a layer consisting of a mixture of elastomer and shrinkable polymer, which can be accomplished for instance by coextruding a three-layer sheath of elastomer/elastomer+shrinkable polymer/shrinkable polymer.

The thickness of the intermediate elastomer layer or the TPE may generally vary between 0.1 and 2 mm measured from the apex of the flexible conduit.

The thickness of the shrinkable polymer sheath (9) may generally vary between 1 and 30 mm and is usually between 3 and 15 mm depending primarily on the diameter of the flexible tubular conduit.

Oil and gas production

The flexible tubular conduit that is the object of this invention is especially suitable for use in oil and gas exploration/extraction where the inner diameter of the flexible metal pipe may be on the order of 20 to 600 mm and more typically between 50 and 400 mm, with the internal pressure in the conduit typically being greater than 1,450 psi and, depending on the diameter, can reach or exceed 7,250 psi or even 14,500 psi. Such flexible pipes are particularly well suited for use involving high temperatures which, depending on the polymers chosen, may reach or exceed values on the order of 100° C. to 120° C. which constitutes the limits currently possible.

EXAMPLES

The following examples illustrate this invention without being in any way limiting in nature.

Around a flexible steel pipe 32 mm (1¼") in diameter and made up of helical turns, or helices, between which there are hollows and interstitial spaces to permit articulated bending, an elastomer layer (8) constituting a continuous tubular envelope or sleeve around the metal pipe is applied by the method indicated in each of the tables relating to each of the examples given, and a semicrystalline polymer layer is extruded or coextruded as indicated in the tables. For purposes of comparison, the same pipe is produced under the same conditions with the same semicrystalline polymer sheath, but without the intermediate elastomer layer.

The pipes are tested in the following manner:

The sheathed pipe is placed on two stationary supports. Using a bending wheel with a radius of 75 mm (3"), pressure is exerted at a point equidistant from the two pipe supports. A pressure of 725 psi is applied. The pipe bends around the wheel. The indentation depth of the wheel indicates the ability of the flexible pipe to deform.

In all the examples the Shore A and D hardness values are measured according to ISO standard 868.

Example 1

In all the tests of Examples 1–4, the semicrystalline polymer is polypropylene (PP) with a melt index of 3 g/mm as measured according to ISO 1133, and a thickness of 5 mm (1.8"). (APPRYL®3030 FN1 by the APPRYL Co.).

The elastomer is:

\* Polyurethane polyether (UTAFLEX® TB 1 by the UETWILLER Co.) - Shore A hardness=50 after reticulation.

\*\* Copolymer of polyamide and polyether units combined by ester functions, PEBAX® 2355 ELF ATOCHEM - Shore A hardness=75; bending modulus at 23° C.=15 MPa as measured according to ISO standard 178.

\*\*\* Polymer $VF_2-C_2F_3Cl$ in a molar 50/50 proportion, having a bending modulus at 23° C. of 250 MPa measured by ISO standard 178.

| Test temperature: 0° C. | | |
| --- | --- | --- |
| Elastomer layer | Application method | Thickness, measured from apex of the helices |
| Polyurethane* 2 components | By induction followed by baking for 1 hour at 80° C. | 0.5 mm |
| Polyether-esteramide** | Elastomer extrusion onto the pipe followed by extrusion of the PP | 1 mm |
| Polymer*** $VF_2$-$VF_3$ | Direct coextrusion of PP onto the steel pipe | 1 mm |

The above test results show better deformability, and in particular better bending ability, of the flexible pipes sheathed with an intermediate elastomer layer sandwiched between the so-called skeleton or frame of the flexible steel pipe and the outer shrinkable polymer sheath (according to this invention).

Example 2

In all of these cases, the elastomer is a polyester polyurethane having a Shore A hardness of 88 (ESTANE® 58271) and a thickness of the elastomer layer of 1.5 mm measured from the apex of the helices.

| Test temperature: 0° C. | | |
| --- | --- | --- |
| Semicrystalline polymer constituting the sealing sheath | Application method | Thickness |
| Polyethylene ($Mn\sim 10^5$ | By extrusion onto the pipe extrusion-coated with elastomer | 5 mm |
| Polyamide-11* (RILSAN BESNO TL | Coextrusion onto the metal pipe | 4 mm |
| Copolymer ethylene/TFE** (TEFZEL 200 by DUPONT | Extrusion onto the metal pipe extrusion-coated with elastomer | 5 mm |

*$40,000 \leq MN \leq 45,000$
**Shore D = 75, impact resistance at −55° C. = 187 J/m measured according to
ASTM D 256.

The above test results show improved deformability, and in particular better bending ability of the flexible pipes which are sheathed with an intermediate elastomer layer sandwiched between the frame of the flexible steel pipe and the outer shrinkable polymer sheath (according to this invention).

Example 3

Around a flexible steel pipe 32 mm (1¼") in diameter and made up of helices between which there are hollows and interstitial spaces to permit articulated bending, the following sheathing is applied by successive extrusions: A layer of polyester polyurethane (ESTANE® 58271) 0.5 mm (0.02") thick from the apex of the helices, and then a vinylidene polyfluoride layer FORAFLON® 1000 HD) (sample 1), 5 mm (0.2") thick. The polyester polyurethane has a Shore A hardness of 88 and displays a viscosity reduction of more than 70% over 30 days at 120° C.

For comparison purposes the same pipe is produced under the same conditions, except without the intermediate polyurethane layer (sample 2).

The two pipes are compared under the conditions shown below.

The sheathed pipe is placed on two stationary supports. Using a bending wheel having a radius of 75 mm (3"), pressure is exerted at a point equidistant from the two pipe supports. A pressure of 725 psi is applied. The pipe bends around the wheel. The indentation depth of the wheel indicates the deformability of the flexible pipe. The maximum height is 170 mm (6.7"); it corresponds to the perfect circumflexion of the pipe over the radius of curvature of the wheel. If during the indentation process the flexible pipe ruptures, the depth is noted. The greater the depth, the greater the bending ability of the pipe.

| | Indentation Depth | |
| --- | --- | --- |
| Temperature | Sample 1 | Sample 2 |
| 20° C. | 170 mm No rupture | 120 mm Rupture |
| −30° C. | Rupture at 150 mm | Rupture at 80 mm |

Example 4

The samples 3 and 4 are prepared in the same manner as samples 1 and 2 except that the vinylidene polyfluoride is plasticized, at 7.5% by weight, with N-butylbenzene sulfonamide.

Sample 3 has an intermediate layer of polyester polyurethane 1 mm (0.04") thick above the apices of the helices, and an outer layer, 6 mm (0.24") thick, of plasticized vinylidene polyfluoride.

Sample 4 does not have an intermediate polyester polyurethane layer.

Successive bending tests of the sheathed pipes are performed on a mandrel having a radius of 68 mm (2.7"). After each new bending test, the pipes are subjected to a temperature of −10° C. for one hour.

Sample 3 could be bent five times without rupturing.

Sample 4 whitens after the fourth bending and splits at the fifth.

The sample pipes 3 and 4 are aged for one month at 150° C. in a ventilated oven.

The same bending test is then performed at −10° C.

Sample 3 whitens at the third bending and cracks at the fourth.

Sample 4 breaks at the first bending.

What is claimed is:

1. A flexible metal pipe whose outer surface has interstitial spaces (5), said pipe being covered with a sealing sheath of shrinkable polymer (9), wherein an elastomer layer (8) is provided intermediate between the shrinkable polymer sheath and the metal pipe, said intermediate elastomer layer being in the form either of a continuous tubular envelope or of a tape, and said intermediate elastomer layer being positioned in said interstitial spaces.

2. A flexible metal pipe according to claim 1 comprising interior and exterior metal walls and being arranged with one or more turns having one or more apexes, said pipe being sheathed with a poly(vinylidene fluoride) layer and a polyurethane thermoplastic elastomer layer, said polyurethane layer being interposed in an intermediate position between the external metal wall of the pipe and the poly(vinylidene fluoride) layer.

3. A pipe according to claim 2 whose polyurethane thermoplastic elastomer layer has a Shore A hardness of less than 92.

4. A pipe according to claim 2 whose polyurethane thermoplastic elastomer layer undergoes a reduction in viscosity of at least 60% after 30 days at 120° C.

5. A pipe according to claim 3 whose polyurethane thermoplastic elastomer layer undergoes a reduction in viscosity of at least 60% after 30 days at 120° C.

6. A pipe according to claim 2 whose polyurethane thermoplastic elastomer has a viscosity at 200° C. within the following limits:

| Corrected shear rate s$^{-1}$ | Viscosity in kPa.s |
|---|---|
| 4.09 | 0.7–1.3 |
| 13.64 | 0.25–0.85 |
| 36.15 | 0.19–0.78 |
| 122.91 | 0.12–0.70 |

7. A pipe according to claim 3 whose polyurethane thermoplastic elastomer has a viscosity at 200° C. within the following limits:

| Corrected shear rate s$^{-1}$ | Viscosity in kPa.s |
|---|---|
| 4.09 | 0.7–1.3 |
| 13.64 | 0.25–0.85 |
| 36.15 | 0.19–0.78 |
| 122.91 | 0.12–0.70 |

8. A pipe according to claim 4 whose polyurethane thermoplastic elastomer has a viscosity at 200° C. within the following limits:

| Corrected shear rate s$^{-1}$ | Viscosity in kPa.s |
|---|---|
| 4.09 | 0.7–1.3 |
| 13.64 | 0.25–0.85 |
| 36.15 | 0.19–0.78 |
| 122.91 | 0.12–0.70 |

9. A pipe according to claim 5 whose polyurethane thermoplastic elastomer has a viscosity at 200° C. within the following limits:

| Corrected shear rate s$^{-1}$ | Viscosity in kPa.s |
|---|---|
| 4.09 | 0.7–1.3 |
| 13.64 | 0.25–0.85 |
| 36.15 | 0.19–0.78 |
| 122.91 | 0.12–0.70 |

10. A pipe according to claim 2 whose intermediate polyurethane thermoplastic elastomer layer has a thickness of 0.1 to 2 mm from the apex of the flexible metal pipe.

11. A pipe according to claim 3 whose intermediate polyurethane thermoplastic elastomer layer has a thickness of 0.1 to 2 mm from the apex of the flexible metal pipe.

12. A pipe according to claim 4 whose intermediate polyurethane thermoplastic elastomer layer has a thickness of 0.1 to 2 mm from the apex of the flexible metal pipe.

13. A pipe according to claim 5 whose intermediate polyurethane thermoplastic elastomer layer has a thickness of 0.1 to 2 mm from the apex of the flexible metal pipe.

14. A pipe according to claim 6 whose intermediate polyurethane thermoplastic elastomer layer has a thickness of 0.1 to 2 mm from the apex of the flexible metal pipe.

15. A pipe according to claim 7 whose intermediate polyurethane thermoplastic elastomer layer has a thickness of 0.1 to 2 mm from the apex of the flexible metal pipe.

16. A pipe according to claim 8 whose intermediate polyurethane thermoplastic elastomer layer has a thickness of 0.1 to 2 mm from the apex of the flexible metal pipe.

17. A pipe according to claim 9 whose intermediate polyurethane thermoplastic elastomer layer has a thickness of 0.1 to 2 mm from the apex of the flexible metal pipe.

18. A flexible pipe consisting essentially of interior and exterior steel walls, said pipe being sheathed with a poly(vinylidene fluoride) layer and a polyurethane thermoplastic elastomer layer, said polyurethane layer being interposed in an intermediate position between the external steel wall of the pipe and the poly(vinylidene fluoride) layer.

19. A flexible pipe according to claim 18 wherein said steel pipe has an internal diameter of from 20 to 400 millimeters, said intermediate polyurethane layer has a thickness of from 0.1 to 2 millimeters, and said poly(vinylidene fluoride) sheathing layer has a thickness of from 1 to 10 millimeters.

20. A flexible pipe according to claim 18 which further comprises a polyurethane layer coated on the internal steel wall of the pipe.

21. A flexible metal pipe whose outer surface has interstitial spaces (5), said pipe being covered with a sealing sheath of shrinkable polymer, wherein an elastomer layer (8) is provided, in the form of either a continuous tubular envelope or a tape positioned in the interstitial spaces (5), intermediate between the shrinkable polymer sheath and the metal pipe, provided that when the shrinkable polymer sheath is composed of poly(vinylidene fluoride), the elastomer layer is not polyurethane.

22. The flexible pipe of claim 21 wherein the shrinkable polymer is a semicrystalline polymer and wherein the elastomer is selected from the group consisting of vulcanized elastomer, reticulated elastomer, thermoplastic elastomer, and mixtures thereof.

23. The flexible pipe of claim 21 wherein the degree of stiffness of the elastomer is less than that of the shrinkable polymer.

24. The flexible pipe of claim 21 wherein the elastomer is selected from the group consisting of silicone elastomers, polyamide thermoplastic elastomers, thermoplastic polyurethanes, ethylene/propylene/diene monomer copolymers, acrylonitrile/butadiene/styrene copolymers, styrene/butadiene/styrene copolymers, methyl methacrylate/butadiene/styrene copolymers, ethylene/carbon monoxide copolymers, ethylene/carbon monoxide/vinyl acetate terpolymers, acrylic rubbers, thermoplastic polyolefins, polyester thermoplastic elastomers, ethylene/ethyl acrylate, ethylene/ethyl acetate, and ethylene/vinyl acetate copolymers and terpolymers, fluorinated elastomers, and mixtures thereof.

25. The flexible pipe of claim 21 wherein the shrinkable polymer is selected from the group consisting of polyolefins, polyamides, polyurethanes, polyureas, polyesters, polyethers, polyoxides, polysulfides, polyether-ether-ketones, copolymers of the preceeding, homopolymers and copolymers of vinylidene fluoride ("VF$_2$"), homopolymers and copolymers of trifluoroethylene ("VF$_3$"), copolymers and terpolymers comprising two or more different members selected from the group consisting of VF$_2$, VF$_3$, chlorotrifluoroethylene, tetrafluoroethylene, hexafluoropropene, and ethylene, said shrinkable polymers being used by themselves or mixed with other polymers in which mixtures said shrinkable polymers are present in amounts of at least 70% by weight.

26. A flexible tubular conduit suitable for moving liquids under high pressure or at high temperatures incorporating a sheathed pipe according to claim 1.

27. The flexible tubular conduit of claim 26 further comprising armor cladding.

28. A method for the production of off-shore oil or gas which comprises transporting said oil or gas from below the floor of the ocean to the surface of the ocean in a flexible tubular conduit according to claim 1.

29. A flexible metal pipe comprising interior and exterior metal walls and being arranged with one or more turns having one or more apexes, said pipe being sheathed with a poly(vinylidene fluoride) layer and a polyurethane thermoplastic elastomer layer, said polyurethane layer being interposed in an intermediate position between the external metal wall of the pipe and the poly(vinylidene fluoride) layer.

* * * * *